UNITED STATES PATENT OFFICE.

JOHANN B. FRIEDOLIN JUD, OF NEW YORK, N. Y.

IMPROVEMENT IN INKS FOR STAMPING PURPOSES.

Specification forming part of Letters Patent No. 140,782, dated July 15, 1873; application filed May 31, 1873.

*To all whom it may concern:*

Be it known that I, JOHANN B. FRIEDOLIN JUD, of the city, county, and State of New York, have invented a certain Compound for the Preparation of Ink used for Stamping Purposes, of which the following is a specification:

The object of my invention is to manufacture an ink for stamps which does not dry on stamps, pads, or ribbons, is perfectly fluid, and leaves no sediment.

To prepare my improved red stamping-ink take red aniline, one part; citric acid, six parts; mucilage, six parts; glycerine, sixty parts; acetic acid, No. 8, twenty parts. The mucilage consists of one part of water and one part of gum arabic. The aniline is first mixed and ground together with the acetic acid, then the citric acid is added, then the mucilage, and then the glycerine, and stir and heat the mixture after the same is cooled, it is ready for use.

To prepare my improved blue stamping-ink, use the same ingredients and proportions as above, with the exception of using blue aniline instead of red aniline; thus, by using the various aniline colors the different desired colored stamping-inks are produced.

It is evident that a slight variation of the named proportions of ingredients will not materially affect the quality of the ink.

Having thus described my invention, I desire to claim—

A stamping-ink, compounded and prepared of the herein-named ingredients, substantially in the proportions and for the purpose hereinbefore set forth.

JOHANN B. FRIEDOLIN JUD.

Witnesses:
ARNIM BRIEGLEB,
FRANKLIN BARRITT.